Feb. 15, 1955  F. V. JENSEN  2,702,114
CABLE CONVEYER
Filed June 13, 1951
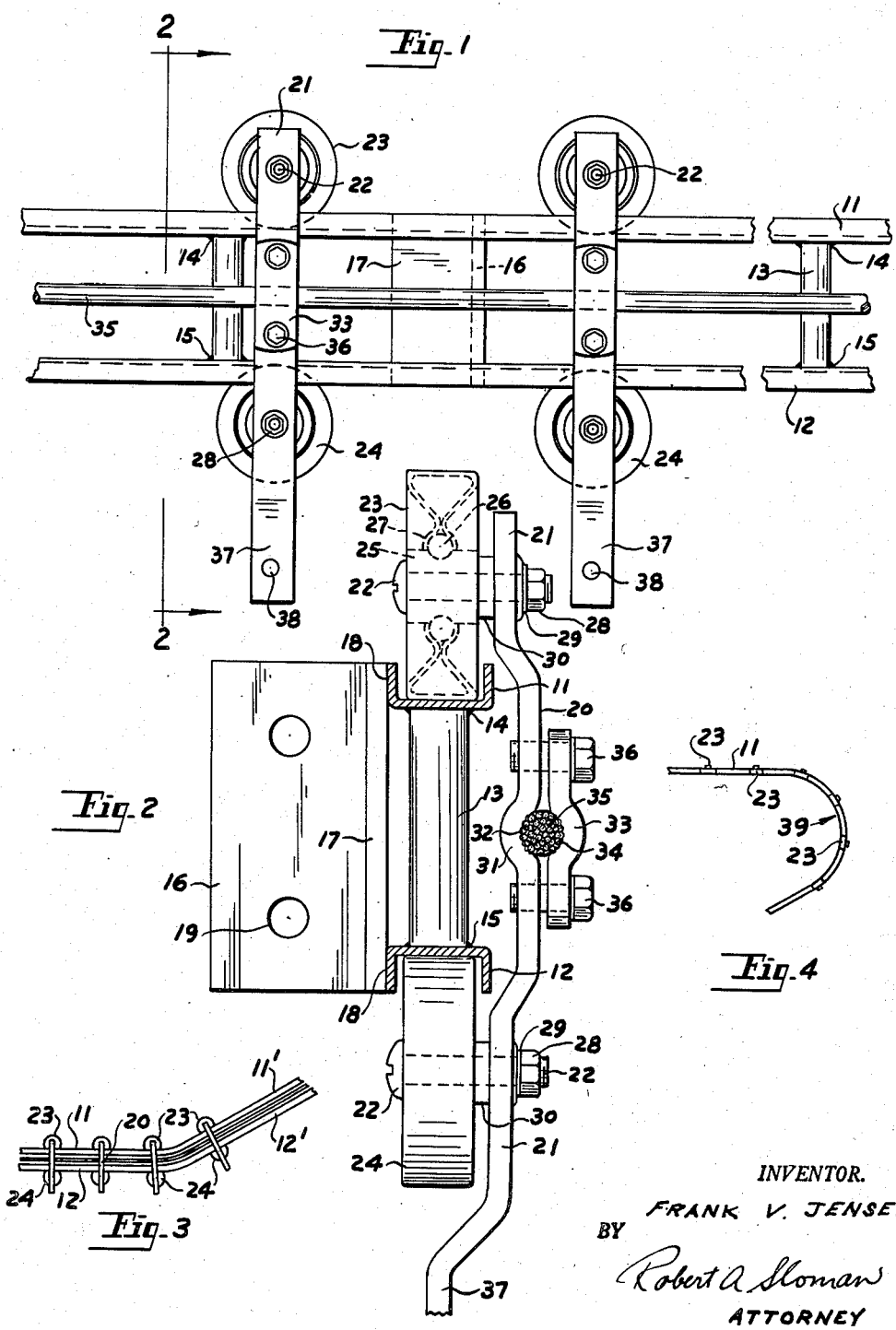
INVENTOR.
FRANK V. JENSEN
BY
Robert A. Sloman
ATTORNEY

United States Patent Office 2,702,114
Patented Feb. 15, 1955

2,702,114

CABLE CONVEYER

Frank V. Jensen, Detroit, Mich., assignor to Jensen Specialties, Inc., Detroit, Mich., a corporation of Michigan Application June 13, 1951, Serial No. 231,412

1 Claim. (Cl. 198—177)

This invention relates to cable conveyors, and more particularly to a conveyor construction employing a pair of out-turned oppositely arranged parallel spaced conveyor supporting channels.

Heretofore conventional type of cable conveyors have been suspended from inverted T or I beams, and it is the object of the present invention to provide a novel and improved cable conveyor which is greatly simplified over other conveyors heretofore constructed.

It is a further object of this invention to provide a novel cable conveyor wherein the trolley arm from which a load may be suspended, carries a pair of upright vertically spaced wheels journaled thereon adapted for positioning within a pair of oppositely arranged parallel spaced U-shaped supporting channels.

It is still further object of this invention to provide a novel and simplified cable conveyor which is easy to assemble and install and which is so constructed as to permit horizontal changes in direction as well as vertical changes in direction of movement.

These and other objects will be seen from the following specification and claim in conjunction with the appendant drawing in which:

Figure 1 is a side elevational view, partially broken away and illustrating the present cable conveyor.

Figure 2 is a section on an enlarged scale taken on line 2—2 of Figure 1.

Figure 3 is a fragmentary side elevational view of the cable conveyor showing the provision for an upwardly inclined direction of travel; and Figure 4 is a fragmentary and diagrammatic plan view of the present cable conveyor illustrating its construction permitting horizontal changes of direction throughout a desired arc.

It will be understood that the above drawing illustrates merely a preferred embodiment of the invention, and that other embodiments are contemplated within the scope of the claim hereinafter set out.

Referring to the drawing the present cable conveyor includes the horizontally extending U-shaped channel 11 and the corresponding inverted U-shaped channel 12 arranged directly thereunder in parallel spaced relation. Spacer rods 13 are interposed between channels 11 and 12 in longitudinally spaced relation and are preferably secured thereto by the welds 14 and 15 as shown in the drawing.

There are also provided a plurality of supporting brackets 16 arranged in longitudinally spaced relation one of which is shown in Figure 1, for supporting said channels in any predetermined fixed position with respect to the ceiling or the wall of a building.

Said brackets include the base element 17 which interconnects and is respectively joined as at points 18 to the channels 11 and 12 as shown in Figure 2. Suitable transverse openings 19 are provided within bracket plate 16 providing one means of attachment to a particular desired supporting structure.

Upright trolley arm 20 is arranged to one side of channels 11 and 12 and terminates in the laterally off-set portions 21 to which are secured the transverse wheel supporting bolts 22.

The wheels 23 and 24 arranged in an upright position have central bushings 25 adapted to receive the bolts 22, and are rotatable with respect to the ball-bearings 26 within their formed annular retainers 27. Said bolts extend through the offset portions 21 of the trolley arm 20 and are secured by the nuts 28, there being a suitable lock washer 29 provided as well as the spacer 30 between bushing 25 and the trolley arm offset portions 21.

As shown in Figure 2 trolley arm 20 has a central concave portion 31 intermediate the wheels 23 and 24 adapted to cooperatively receive one side of the longitudinally movable cable 35. And it will be noted that said cable is parallel to the intermediate channels 11 and 12, being arranged upon one side thereof. Clamping plate 33 has a central oppositely arranged concave depression 34 adapted to cooperatively receive the opposite side of cable 35. It will be noted from Figure 2 that the interior surfaces of the concave depressions 32 and 34 are abraided for increased frictional engagement with said cable.

Clamping plate 33 is secured with respect to trolley arm 20 and said cable by means of a pair of bolts 36 which extend loosely through plate 33 and through threaded openings in the trolley arm 20. By this construction the trolley arm may effectively be clamped on to cable 35 for movement therewith, whereby upon movement of said cable said trolley arm will be moved longitudinally with its wheels 23 and 24 riding within channels 11 and 12 respectively.

The lower offset portion 21 of trolley arm 20 has a depending laterally offset portion 37 having a transverse notch 38 therethrough at its lower end adapted to receive any suitable load carrying and transporting hook.

It will be noted from Figure 2 that the offset hook support 37 is in substantial alignment with the central transverse axis of wheels 23 and 24 so that the vertical thrust of the load is directly below the points of engagement of said wheels within channels 11 and 12.

It will be understood that the side walls of the channels 11 and 12 are adapted to cooperatively and retainingly engage said wheels in the event that there is any tendency of said wheels to move in a direction in non-alignment with said channels, as would be the case where the channels terminate in an arcuate portion 39 such as fragmentarily illustrated in Figure 4.

It is also apparent from Figure 4, in view of said flanges that said cable conveyor may be formed so as to make any desired horizontal curve from one degree to 270 degrees without the use of idlers or sprockets.

It will also be noted from Figure 2 that the cable 35 is intermediate the channels 11 and 12 as well as the wheels 23 and 24 to thereby equalize the thrust of said cable with respect to said trolley arm so that said thrust is equally distributed between said wheels.

It is contemplated that the present cable conveyor is also adapted to vertical changes in direction and may be inclined downwardly, or upwardly as shown at 11' and 12' in Figure 3 of the drawing.

By the present construction the cable conveyor may extend in any desired direction so that the trolley arm and wheels may move thereover throughout straight portions, curved portions as in Figure 4 or inclined portions as in Figure 3.

As shown in Figure 1 there are shown a pair of trolley arms 20 and it is contemplated that any number of said arms may be employed selectively clamped to cable 35 and these arms may be arranged at any desired distance from an adjacent arm.

Having described my invention, reference should now be had to the claim which follows for determining the scope thereof.

I claim:

In a cable conveyor, a pair of horizontally extending oppositely arranged upwardly and downwardly directed channels joined together in parallel spaced relation, an upright trolley arm at one side of said channels, spaced upright wheels of rectangular cross-section journaled upon said arm and riding within said channels respectively, a longitudinally movable cable intermediate and to one side of said channels and clamped to said trolley arm intermediate said wheels, the central portion of said trolley arm intermediate said wheels having a concave depression to receive one side of said cable, a clamping plate having an oppositely arranged concave depression to receive the other side of said cable, and bolts loosely extended through said plate threadably engaging said arm for securing said plate and arm with respect to said cable.

References Cited in the file of this patent

UNITED STATES PATENTS

| | | |
|---|---|---|
| 573,772 | Feldmann | Dec. 22, 1896 |
| 1,747,388 | Pearson | Feb. 18, 1930 |
| 1,907,894 | Stevens et al. | May 9, 1933 |
| 2,114,929 | Lefiell | Apr. 19, 1938 |
| 2,371,624 | Hudson | Mar. 20, 1945 |